(No Model.)
P. JOHNSON.
FERTILIZER DISTRIBUTER.
No. 325,249. Patented Sept. 1, 1885.
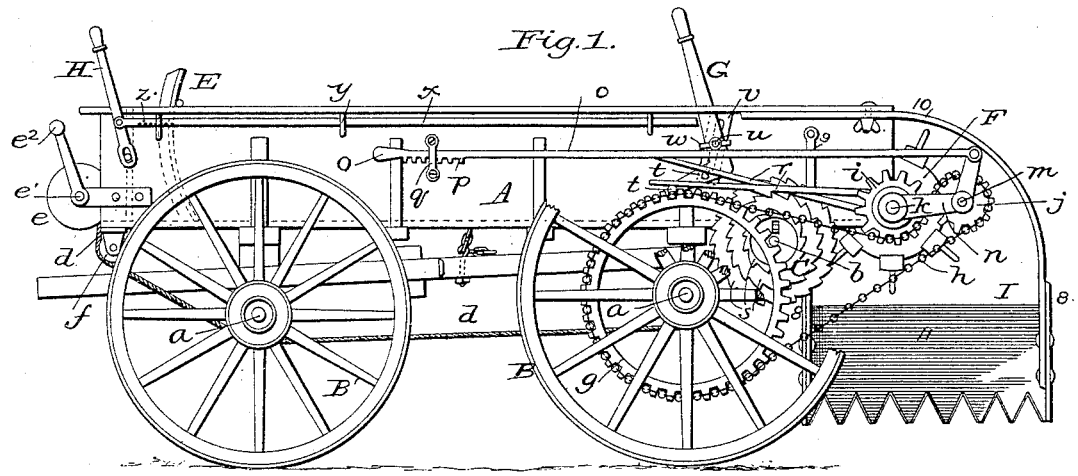
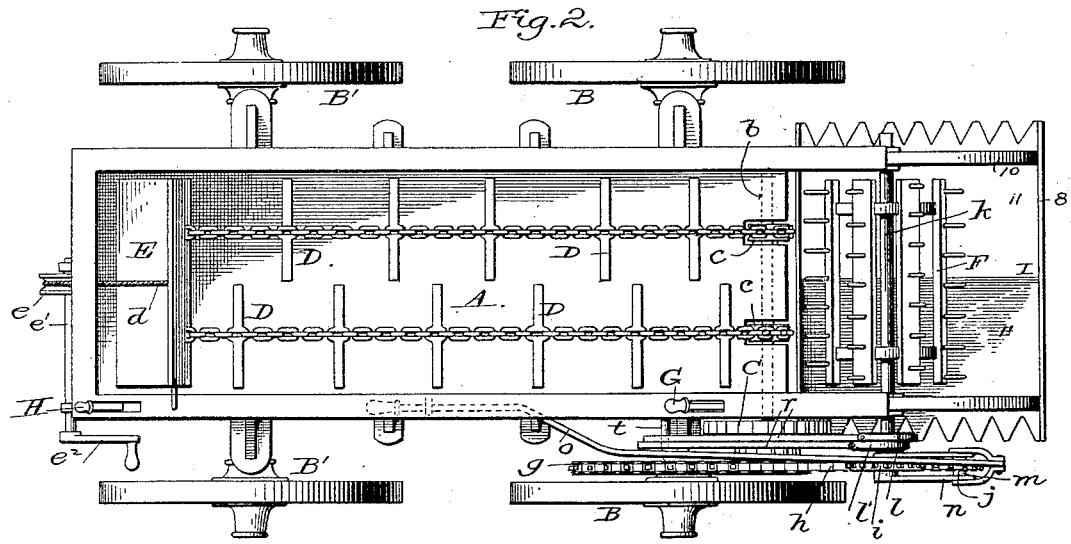
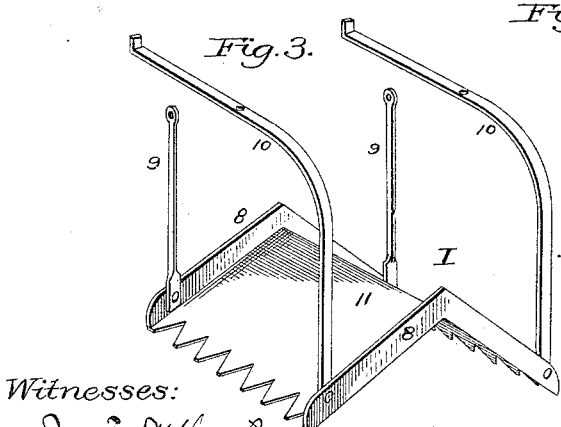
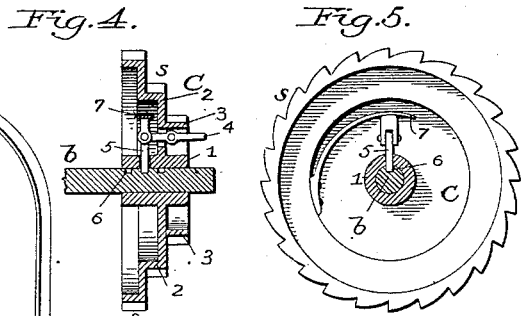
Witnesses:
Inventor:
Peter Johnson,
by Dodge & Son,
his Attys.

United States Patent Office.

PETER JOHNSON, OF DASSEL, MINNESOTA.

FERTILIZER-DISTRIBUTER.

SPECIFICATION forming part of Letters Patent No. 325,249, dated September 1, 1885.

Application filed June 19, 1885. (No model.) Patented in Canada December 6, 1884, No. 20,698.

*To all whom it may concern:*

Be it known that I, PETER JOHNSON, of Dassel, in the county of Meeker and State of Minnesota, have invented certain new and useful Improvements in Fertilizer-Distributers, of which the following is a specification, and for which I have received Letters Patent in Canada, dated December 6, 1884, No. 20,698.

My invention relates to apparatus for pulverizing and distributing fertilizers; and it consists in various features hereinafter set forth.

In the drawings, Figure 1 is a side view of a wagon provided with my improved apparatus; Fig. 2, a top plan view, and Figs. 3, 4, and 5 views illustrating certain details.

This invention is designed as an improvement upon that for which Letters Patent of the United States were granted to me bearing date June 3, 1884, and numbered 299,648.

In its general appearance the machine resembles that shown in my patent just referred to, and any detail not described herein will be found in said patent, to which reference is hereby made for such purpose.

A represents the wagon-body, carried by wheels B B', which are mounted on axles $a$. Under the body of the wagon, at its rear end, is a shaft, $b$, said shaft being provided at its outer end with a triple ratchet-wheel, C, and within the wagon-body with sprocket-wheels $c\ c$.

D D are the feeding chains or ropes which move along the bottom of the wagon, as indicated in Fig. 2, said chains passing at the rear of the wagon over the sprocket-wheels $c$ and being attached to a cross-bar. (Not shown in the drawings.) At the forward end of the wagon the chains D connect with scraper E, said scraper and chains being constructed substantially as in my former patent. A rope, $d$, passes from the front of the scraper around a wheel, $e$, secured rigidly upon a shaft, $e'$, thence downward and under a wheel, $f$, mounted on the bottom of the wagon, and thence to the rear, where it connects with the cross-bar attached to the chains at the rear of the wagon. This forms in effect an endless belt, to which a slow motion is given. As the chains are caused to travel rearwardly with the scraper, by mechanism hereinafter described, the rear end passes underneath the wagon-body and is carried forward by the rope $d$ until the scraper reaches the end of the wagon. When this occurs, to reverse the movement of the chains and ropes D $d$ and to effect this manually, the shaft $e'$ of the wheel $e$ is provided with a crank or handle, $e^2$, by which to turn the wheel. As the wheel $e$ is turned the rope $d$ winds upon the same at one side and off at the other side until the scraper is brought back to the position indicated in Figs. 1 and 2.

Secured rigidly upon one of the driving-wheels B is a sprocket-wheel, $g$, about which a chain, $h$, passes, said chain passing under a second wheel, $i$, and around a third wheel, $j$, as shown in Fig. 1, giving wheel $i$ a motion contrary to that of the wheel $g$. The wheel $i$ is mounted on a shaft, $k$, journaled in arms or supports at the rear of the wagon-body, said shaft $k$ carrying the distributing-cylinder F and two cranks or eccentrics, $l\ l$, as shown in Fig. 2. Wheel $j$ is mounted on a shaft or axle, $m$, which is carried by the bifurcated elbow-lever, $n$, journaled at one end on the shaft $k$, and connected at its other end to a rod, $o$, extending alongside the wagon-body, and provided with teeth or notches $p$ at its forward end. The forward end of the rod $o$ is carried in a loop or guide, $q$, and by engaging the teeth $p$ with the lower edge of the latter the rod $o$ may be held at any desired position. This construction is designed to throw the gear $i$ out of motion, and thereby stop the rotation of the distributing-cylinder. By moving the rod $o$ longitudinally toward the rear of the wagon the elbow-lever $n$, carrying the sprocket-wheel $j$, is rocked or tipped on the shaft $k$, so that the upper portion of the chain $h$ will not be in contact with wheel $i$, and consequently the latter will not rotate. This also prevents the action of chains D. The chain $h$ is so constructed that one or more links may be detached, and by removing a few links and passing the chain $h$ only on sprocket-wheels $g$ and $i$, the motion of the shaft $k$ and cylinder F is reversed when so desired.

Connected with the eccentric $l$ on the shaft $k$, by straps $l'$, are pawls $r$, which project over and engage with the teeth s of the triple ratchet-wheel C, as shown in Figs. 1 and 2, said pawls r extending quite a distance in advance of wheel C and resting upon studs t, carried by a rocking lever, G, also shown in Fig. 1. As the shaft k rotates the eccentrics l cause the pawls r to ride forward and engage with a tooth, s, of the wheel C, and to turn the latter, the two pawls r being so arranged that they both engage with the same set of teeth, and while one is causing the cylinder F to revolve the other is moving forward preparatory to engagement with a fresh tooth. This alternating action is kept up continuously during the operation of the cylinder, unless the pawls are thrown out of engagement with the ratchet-wheel, in a manner now to be described.

The pivot u of the lever G, above referred to, is mounted in a slotted plate, v, secured to the side of the wagon-body, and is held at any desired height by means of a thumb-screw, w, as shown in Fig. 1.

When it is desired to stop the feeding by the chains or the backward movement of the scraper, the hand-lever G is thrown backward and the studs t on the lower arm thereof raise the pawls r so high as to prevent their engagement with the teeth s of the ratchet-wheel C. When in this position, the cylinder F may continue to rotate, but the chains D remain stationary, the pawls r in the meanwhile being supported at their forward ends by the lever G during their movement or reciprocation by the eccentrics l.

In order to operate the rocking lever G from the front end of the wagon, I provide a sliding rod or bar, x, which is carried in guides or loops y, and attached at its forward end to a pivoted hand-lever, H. The forward end is also provided with teeth z, to engage with one of the guiding-loops by which the rod is held in any desired position. By rocking the lever H the rod x connected therewith is moved longitudinally, when its end comes in contact with the lever G, and rocks the latter upon its pivot, and thereby raises the pawls r out of engagement with the wheel C.

To vary the amount of fertilizer to be distributed to the acre, it is necessary to vary the rate of travel of the chains D, and this is accomplished by the construction now about to be described. The ratchet-wheel C is composed of a hub, 1, and bears two laterally-projecting smaller ratchet-wheels, 2 and 3, the whole being preferably cast in one piece, as indicated in Fig. 4, the three ratchet-wheels being of such size as to make each a given and different number of revolutions while the wagon is traveling over an acre of ground. Parallel with the shaft b of wheel C, and extending through the latter, is a lever, 4, pivoted in the wheel, as indicated in Fig. 4, said lever carrying at its inner end a dog or bolt, 5, which passes radially through the hub 1 and enters a notch, 6, in the shaft b. A spring, 7, rigidly secured to the wheel C at one end, bears at its other end upon the inner end of the lever 4, and thus serves to keep the dog or bolt 5 in the notch 6. In Fig. 1 the pawls r are shown in engagement with the intermediate ratchet-wheel, 2; but should it be desired to give a greater or less feed it is only necessary, after the pawls r have been raised, to depress the free end of lever 4 and raise the dog or bolt 5 out of its notch 6. The wheel C can then be moved upon its shaft b to bring the largest or the smallest ratchet-wheel under the pawls, and when in the proper position the spring 7 is allowed to press the bolt or dog 5 into its notch or seat 6, as shown in Figs. 4 and 5. As the material is fed out by the chains D it falls upon the delivery-board I. (Shown detached in Fig. 3.) Said delivery-board I has its front and rear edges turned up to form flanges 8 to prevent the escape of the material at those points, and to these flanges are bolted or otherwise secured the suspending arms or hangers 9 and 10, the former being bolted to the sides of the wagon-body, and the others being secured to the overhanging side guards of the wagon, as shown in Fig. 1. The bottom 11 of the delivery-board I slopes from the center downward toward the sides of the wagon, and the lower edges of the bottom are scalloped, as shown, to separate and scatter the material.

Having thus described my invention, what I claim is—

1. The herein-described fertilizer-distributer, consisting of wagon A, wheels B, sprocket-wheels g i j, cylinder F, and chain h, passing about the wheels g j and in contact with wheel i.

2. In combination with wagon A and wheels B, sprocket-wheel g, chain h, shaft k, provided with wheel i and cylinder F, and arm n, provided with wheel j and journaled on shaft k, as and for the purpose set forth.

3. In combination with wagon A and wheels B, sprocket-wheel g, chain h, shaft k, provided with wheel i and cylinder F, arm n, provided with wheel j and journaled on shaft k, and rod or bar o, connected with the arm n and provided with teeth or notches p, as and for the purpose set forth.

4. In a fertilizer-distributer, in combination with body A, shaft k, mechanism for imparting rotary motion thereto, eccentric l, pawls r, ratchet-wheel C, and hand-lever G, provided with studs t, as and for the purpose set forth.

5. In a fertilizer-distributer, in combination with body A, shaft k, mechanism for imparting rotary motion thereto, eccentrics l, pawls r, ratchet-wheel C, hand-lever G, provided with studs t, hand-lever H, and rod x, as and for the purpose set forth.

6. In a fertilizer-distributer, substantially such as shown and described, the distributer I, consisting of inclined bottom 11, front and rear flanges 8, and arms 9 10.

7. In a fertilizer-distributer, the combination of a wagon-body, a shaft, b, journaled therein and provided with sprocket-wheels c, seats or sockets 6, and ratchet-wheel C, and chains D, said ratchet-wheel being adapted, substantially as described, to slide upon the shaft b.

8. In a fertilizer-distributer, the combination of a wagon-body, a shaft, b, journaled therein and provided with ratchet-wheel C, and socket 6, pivoted lever 4, and spring 7, all arranged as shown.

PETER JOHNSON.

Witnesses:
A. F. JOHNSON,
L. W. LEIGHTON.